United States Patent [19]

Hashimoto et al.

[11] Patent Number: 4,682,254
[45] Date of Patent: Jul. 21, 1987

[54] GIMBAL SPRING SUPPORTED MAGNETIC RECORDING HEAD

[75] Inventors: Shingo Hashimoto; Kazuyuki Sunaga; Kaoru Kasugai, all of Saitama, Japan

[73] Assignee: Citizen Watch Co., Ltd., Tokyo, Japan

[21] Appl. No.: 708,791

[22] Filed: Mar. 6, 1985

[30] Foreign Application Priority Data

Mar. 14, 1984 [JP] Japan .............................. 59-37329[U]

[51] Int. Cl.$^4$ .......................... G11B 21/20; G11B 5/48
[52] U.S. Cl. ..................................... 360/103; 360/104; 360/125
[58] Field of Search ............................... 360/103–104, 360/125, 105

[56] References Cited

U.S. PATENT DOCUMENTS

| | | | |
|---|---|---|---|
| 3,581,298 | 5/1971 | Billawalla | 360/103 |
| 3,702,461 | 11/1972 | Cantwell | 360/103 |
| 3,823,416 | 7/1974 | Warner | 360/103 |
| 3,896,495 | 7/1975 | Beecroft | 360/105 X |
| 3,914,792 | 10/1975 | Beecroft | 360/104 X |
| 3,975,770 | 8/1976 | Spash et al. | 360/103 |
| 4,058,843 | 11/1977 | Gyi | 360/103 |
| 4,151,573 | 4/1979 | Tandon et al. | 360/104 |
| 4,152,742 | 5/1977 | Kronfeld | 360/125 |
| 4,327,388 | 4/1982 | Wanek | 360/104 |
| 4,328,521 | 5/1982 | Peyton et al. | 360/104 |
| 4,389,688 | 6/1983 | Higashiyama | 360/104 |
| 4,432,027 | 2/1984 | Higuchi | 360/103 X |
| 4,449,155 | 5/1984 | Meier et al. | 360/103 X |
| 4,620,251 | 10/1986 | Gitzendanner | 360/103 |

Primary Examiner—Robert S. Tupper
Assistant Examiner—Alyssa H. Bowler
Attorney, Agent, or Firm—Koda and Androlia

[57] ABSTRACT

A magnetic recording head includes a read/write core and an erase core sandwiched and fixedly connected between a main slider and an auxiliary slider, a coil assembly having back bars closely attached to the respective cores which a read/write coil and an erase coil are wound around and fixed thereon, and a gimbal spring on which the main slider is fixed. The read/write coil and the erase coil are laterally arranged along in parallel with the gimbal spring, and the sliders, the cores and the coil assembly are respectively arranged on the one side of the gimbal spring.

2 Claims, 7 Drawing Figures

GIMBAL SPRING SUPPORTED MAGNETIC RECORDING HEAD

BACKGROUND OF THE INVENTION

1. Field of the Invention

The present invention relates to a magnetic recording head, and, more particularly, to an improvement of small sized magnetic recording head which is preferable for a floppy disk drive or the like.

2. Description of the Prior Art

There is known a magnetic disk as a data recording medium necessary for computers or the like, and particularly the floppy disk drive is currently of wide utilization since it is less expensive, small and easily handled. In order to write or read data to or from this kind of magnetic disk there is known a magnetic head which forms an electromagnetic transducer and controls to write or read the recording data to or from the magnetic disk during its rotation by means of the close contact of magnetic gaps accompanying associated magnetic coils with the magnetic recording surface of the magnetic disk.

However, the apparatus in recent years requested to be designed in small sizes has required to design a small and particularly thin sized magnetic head, but there cannot be obtained the magnetic head which meets such a request sufficiently.

FIG. 7 shows principal portions of a conventional magnetic head in the prior art. A read/write core 12 and an erase core 14 are fixed to a slider 10 which comes in contact with the magnetic disk of data recording medium. The requested recording data are written or optionally read to or from the magnetic disk through the gaps 12a and 14a of the respective cores.

In the magnetic head shown in FIG. 7 the erase gap 14a is used so that the unnecessarily recorded side portion can be erased in order to store the recorded data into every correct track separately from the other, as is known well.

A read/write coil 16 and an erase coil 18 are respectively wound around and fixed to both of the cores 12 and 14 so that the externally input signal can excite each of the coils 16 and 18 and the electric current induced through the coils can be selected at the time of reading the data. Both of the cores 12 and 14 are magnetically connected at the coil ends by back bars 20 and 22 to form a predetermined magnetic circuit.

The magnetic head in the prior art is composed as mentioned hereinabove. A slider 10 is fastened to a gimbal spring at the lower surface and inclinable supported by a carriage or an arm, not illustrated.

Accordingly, in the prior art the height of the magnetic head itself increases very much and on both sides of the gimbal spring 24 there are projected the slider 10 on the one side and the coils 16 and 18 on the other side, as is evident from FIG. 7. The apparatus, therefore, becomes large in height as a whole.

Particularly, in the floppy disk drive, the medium itself is contained in a floppy disk case or a cartridge, and the distance from the gimbal spring to the gaps is inevitably required since the gaps need to be extended from the carriage (arm) to the medium exceeding the thickness of the floppy disk case (cartridge) through the guide hole of the case. With regard to this point, this distance is required for the apparatus as necessary for reaching the gaps to the media. On the other hand, however, the projected dimension to the opposite side from the gaps in relation to the gimbal spring directly increases the thickness of the apparatus, and does not meet the request for small size against the prior art device.

SUMMARY OF THE INVENTION

In view of the above problems in the prior art, it is therefore an object of the present invention to provide a small sized thin magnetic recording head.

In keeping with the principles of the present invention, the object is accomplished with a magnetic recording head which comprises as read/write core and an erase core sandwiched and solidified between a main slider and an auxiliary slider, a coil assembly having backbars closely attached to the respective cores which a read/write coil and erase coil are wound around and fixed thereon, and a gimbal spring on which the main slider is fixed, wherein the read/write coil and the erase coil are laterally arranged along in parallel with the gimbal spring, and the sliders, the cores and coil assembly are respectively arranged on the one side of the gimbal spring.

BRIEF DESCRIPTION OF THE DRAWINGS

FIG. 3 is a side view of FIG. 2 showing a state a gimbal spring is built in;

DETAILED DESCRIPTION OF THE EMBODIMENT

Figure 1:
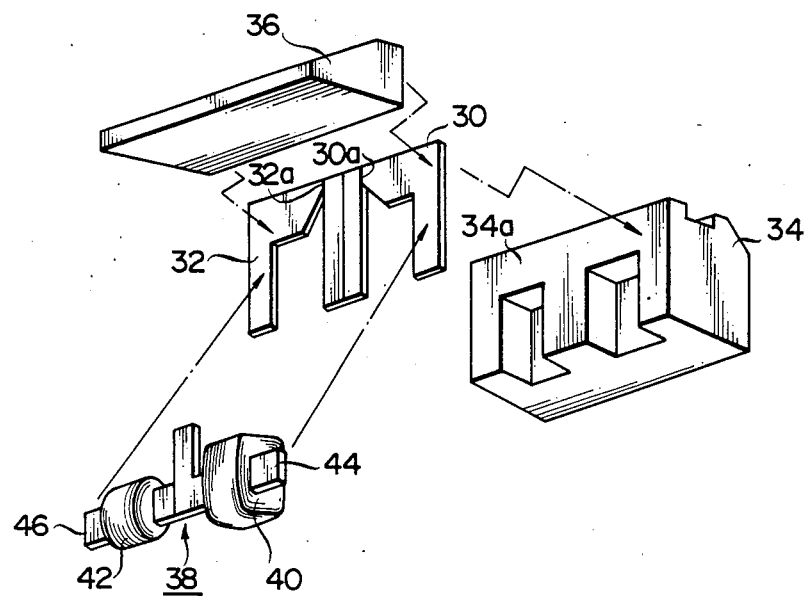
FIG. 1 is a perspective view being set apart and showing a preferred embodiment of a magnetic recording head in accordance with the teachings of the present invention.
Figure 2:
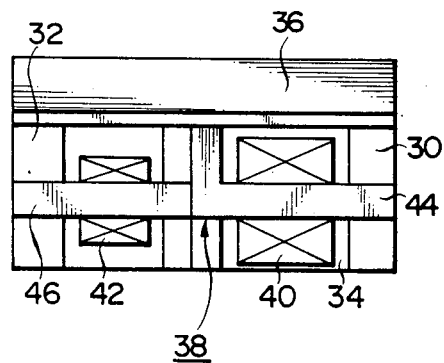
FIG. 2 is a front elevational view showing an assembled state of FIG. 1.
Figure 3:
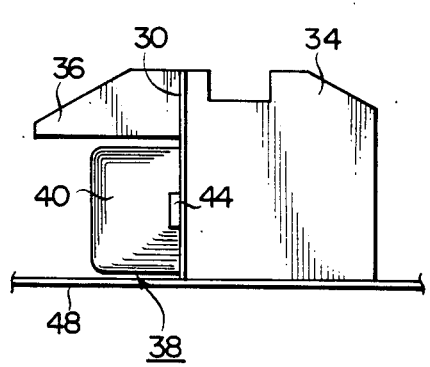

In FIG. 1 shown therein is a perspective view being set apart and showing a preferred embodiment of a magnetic recording head in accordance with the teachings of the present invention. FIG. 2 is a front elevation showing an assembled state of FIG. 1, and FIG. 3 is a side view of FIG. 2 showing a state a gimbal spring is built in.

In Figures a read/write core 30 an an erase core 32 are sandwiched and fixed by a preferred binder between a main slider 34 and an auxiliary slider 36. Both of the cores mentioned above consists of bulk cores respectively having the similar magnet gaps 30a and 32a as the ones in the prior art, but length (height) of the cores are shortly formed, which differs from the cores in the prior art.

The main slider 34 is made from ceramic and, in the embodiment, as evident from Figures, has same bonding area 34a with the flat surface side of the cores 30 and 32. Such a wide bonding area provides a sufficiently high strength when the main slider 34 is fixed with both of the cores 30 and 32 by epoxy glues or the like. The auxiliary slider 36 is also fixed to the opposite side of the cores 30 and 32 from the main slider 34 with high strength by epoxy glues in the same manner. Thus, the cores 30 and 32 are glued and fixed between the main slider 34 and the auxilary slider 36. Accordingly, when the disk sliding surface of the head is grinded or polished to accomplish desired smoothness of its plane surface no separation at the glued portion occurs, and the gaps 30a and 30b can be built in and fixed to a predetermined position of the slider surface with high accuracy.

In the present invention, a coil assembly 38 is fixed to both of the cores 30 and 32 which are fixedly connected with the sliders 34 and 36. In the present invention, furthermore, the coil assembly 38 has a read/write back bar 44 and an erase back bar 46 which the read/write coil 40 and the erase coil 42 are respectively wound and fixed around, and both of the back bars 44 and 46 solidly fixed together. At such assembled state the back bars 44 and 46 are built in and fixed to the cores 30 and 32.

According to the present invention, therefore, it is understood that both of the coils 40 and 42 are composed as such lateral installation that the axis of the coils are in parallel with the planer surface of the head. Accordingly, as described hereinafter, all of the components can be put up an arranged along the one side of the gimbal spring, and the apparatus can be designed thinner to the greater extent.

Furthermore, the contact positions of both of the back bars 44 and 46 with the cores 30 and 32 are arranged so closely to the respective corresponding gaps 30a and 32a that magnetoresistance at the contact positions between the back bars and the cores can be sufficiently reduced.

Moreover, according to the present invention, since the coil assembly 38 including the coils 40 and 42 wound around and fixed to the back bars is attached to the cores 30 and 32 after they have been sandwiched and fixed between the main slider 34 and the auxiliary slider 36, as was mentioned above, the assembly can be preferably processed. Furthermore, as the present invention does not have such composition that the coils are assembled after the cores have been built on the gimbal spring as was done with the prior art but all of the components are arranged along the one side of the gimbal spring, the extremely preferable process of assembly can be easily accomplished.

In FIG. 3 shown therein is such a state that the magnetic head assembled in accordance with the teachings of the present invention as mentioned above is built on the gimbal spring. As evident from Figure, only lead wires are simply exposed on the opposite side from the gaps in relation to the gimbal spring 48. Thus, the thickness of the carrier or the arm carrying the magnetic head can be remarkably reduced so much that the floppy disk is designed to be thinner as a whole.

Furthermore, in FIG. 3, the auxiliary slider 36 is projectingly attached over the coils 40 and 42 just like eaves, and the damage of the magnetic head caused in the contact with other components, particularly in disconnection of the coils, can be firmly prevented.

Figure 4:
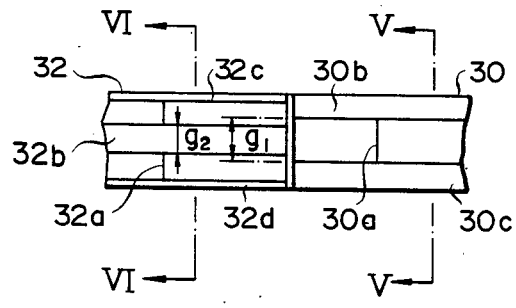
FIG. 4 is a top view of bulk cores in the embodiment.
Figure 6:
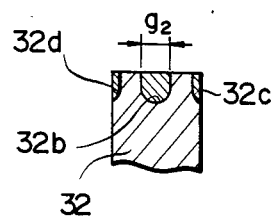
FIGS. 5 and 6 are sectional views of bulk cores shown in FIG. 4, respectively taken on line V—V and VI—VI.
Figure 5:
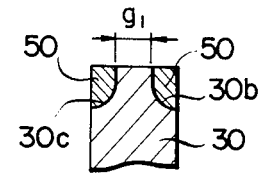
Figure 7:
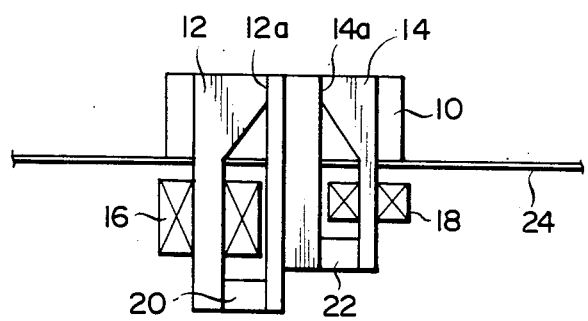
FIG. 7 is a front elevational view showing a magnetic head of the prior art, wherein a part of slider is deleted.

In FIG. 4 shown therein is a preferable example of bulk cores in this embodiment as was previously described, FIG. 5 is a sectional view of its read/write core, and FIG. 6 shows a sectional view of its erase core.

In this embodiment, as evident from Figures, the read/write core 30 has grooves 30b and 30c on its sliding side along the two edges, and the grooves 30b and 30c are filled with a filler 50 of glass or the like. In the same manner, the erase core has the same grooves 32b, 32c and 32d along the center and the two edges which are filled with glass or the like.

Accordingly, the requested width of the gaps can be obtained easier than the one in the laminated cores in the prior art. Furthermore, in the embodiment, the gap width $g_1$ of the read/write gap formed as previously described is established wider than the center groove width $g_2$ of the erase core 32 so that the written track width can be shaped its edges into the appropriate width by the center groove width $g_2$ and the erase core and the error in the written track width can be trimmed and corrected into the requested pattern.

As described heretofore, according to the present inventon, the read/write core and the erase core are sandwiched and fixed between the main slider and the auxiliary slider, and the back bars having the coils laterally installed thereon are fixed to the cores mentioned above. Furthermore, all of the components are arranged along the one side of the gimbal spring. Thus, the apparatus can be designed thinner and provide the better assembling process so the the present invention is extremely preferable for the floppy disk drive having two side heads.

What is claimed is:

1. A magnetic recording head for a floppy disk drive which is supported by a gimbal spring comprising:
    a read/write core and an erase core sandwiched between and fixedly connected to a main slider and auxiliary slider; and
    a coil assembly having back bars closely attached to said respective read/write and erase cores on which a read/write coil and an erase coil are directly wound around and fixed thereon, said read/write coil and said erase coil being provided with an axis of said read/write coil and said erase coil in parallel wtih said gimbal spring with said read/write and erase cores and said coil assembly together with said sliders being provided only on one side of the gimbal spring.

2. A magnetic recording head according to claim 1 wherein the auxiliary slider is projectingly attached to the main slider superjacent the cores so as to provide an eave-like protector for preventing the disconnection of the coils.

* * * * *